United States Patent
Hofmann et al.

(10) Patent No.: US 7,158,471 B2
(45) Date of Patent: Jan. 2, 2007

(54) DEVICE AND METHOD FOR READING MULTILAYER OPTICAL DISK WITH COMPENSATION OF SHADING EFFECTS

(75) Inventors: Holger Hofmann, Neustetten (DE); Hartmut Richter, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 318 days.

(21) Appl. No.: 10/416,263

(22) PCT Filed: Oct. 29, 2001

(86) PCT No.: PCT/EP01/12498

§ 371 (c)(1), (2), (4) Date: May 8, 2003

(87) PCT Pub. No.: WO02/39439

PCT Pub. Date: May 16, 2002

(65) Prior Publication Data

US 2004/0032816 A1 Feb. 19, 2004

(30) Foreign Application Priority Data

Nov. 10, 2000 (EP) ............................... 00124632

(51) Int. Cl.
*G11B 7/00* (2006.01)

(52) U.S. Cl. .................... 369/124.11; 369/285

(58) Field of Classification Search ............ 369/124.11
See application file for complete search history.

(56) References Cited

U.S. PATENT DOCUMENTS

| 5,373,499 | A |   | 12/1994 | Imaino et al. ........... 369/275.4 |
| 5,559,784 | A | * | 9/1996 | Ota .......................... 369/94 |
| 5,627,816 | A |   | 5/1997 | Ito et al. .................. 369/175.1 |
| 5,905,702 | A |   | 5/1999 | Inoue ..................... 369/44.29 |
| 6,101,157 | A | * | 8/2000 | Bradshaw et al. ....... 369/44.35 |
| 6,434,095 | B1 | * | 8/2002 | Nishiuchi et al. ....... 369/44.27 |
| 2002/0051414 | A1 | * | 5/2002 | Kuribayashi ............ 369/53.24 |

\* cited by examiner

*Primary Examiner*—Andrea Wellington
*Assistant Examiner*—Lixi Chow
(74) *Attorney, Agent, or Firm*—Joseph J. Laks; Harvey D. Fried; Patricia A. Verlangieri

(57) ABSTRACT

The invention refers to a device and a method for scanning an optical data carrier by means of a main scanning beam being reflected by the data carrier and being detected by means of a photodetector, the data carrier having first and second layers to be scanned, the second layer being scanned through the first layer, light passing the first layer being shaded dependent on local properties of the first layer. An object of the invention is to propose a device having increased performance even for use with multi layer disks having a layer causing light fluctuations on a layer to be scanned, as well as a respective method. According to the invention such device is provided with means for keeping an output signal of the photodetector independent of variations of shading.

5 Claims, 2 Drawing Sheets

Figure 1:
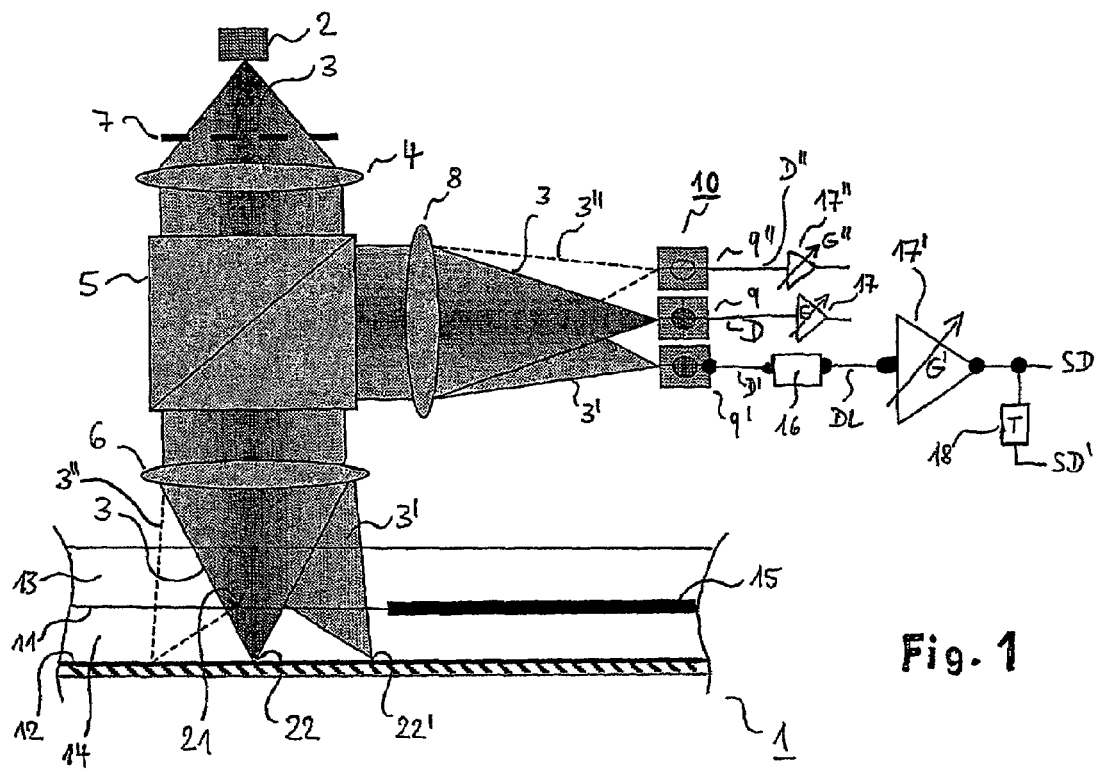

DEVICE AND METHOD FOR READING MULTILAYER OPTICAL DISK WITH COMPENSATION OF SHADING EFFECTS

This application claims the benefit, under 35 U.S.C. § 365 of International Application PCT/EP01/12498, filed Oct. 29, 2001, which was published in accordance with PCT Article 21(2) on May 16, 2002 in English and which claims the benefit of European patent application No. 00124632.1, filed Nov. 10, 2000.

The invention refers to a device and a method for reading and/or writing dual layer or multi layer optical disks, also referred to as scanning such optical data carriers. Use of multiple layers is one possibility to increase storage capacity of an optical disk. Amongst others, phase-change dual-layer recording is regarded to be one of the most promising technologies for recording optical disks. A dual layer disk is provided with a first layer which is semi-transparent and partly reflective, and a second layer which is reflective. The second layer is scanned with a beam of light that passes through the first layer. In case of a partly written first layer or in case of a disk according to a so-called hard-sectorized format the first layer causes light intensity fluctuations on the second layer due to different light transmission in already written areas and areas not yet written to. These light fluctuations are also referred to as shading or shading effect in the following. According to said hard-sectorized formats sectorization is done for example by pre-embossed markings, the so-called pre-pits. A pre-pit area is an example of an already written area, a recorded area is another example. Hard sectorized formats are e.g. based on land/groove and prepit structure as e.g. used for the known DVD-RAM standard. The light fluctuations on the second layer mentioned above significantly reduce read out performance and recording signal quality. This is especially the case if phase-change recording layers are used as these are very sensitive on recording laser power changes. However, the problem mentioned above occurs not only with dual layer phase-change materials, but with all multi-layer disks in combination with materials, where information is stored in sequences that cause dark and bright sequences in the transmitted light. Such dark and bright sequences may have several causes, e.g. different reflectivity, different absorption factors or different interference behaviour, destructive/constructive, of different areas of a layer, or differences in other properties having similar effect. The different layers may be of a single type or of different types, as recordable, pre-recorded or non-recorded.

It is an object of the invention to propose a device having increased performance even for use with multi layer disks having a layer causing light fluctuations on a layer to be scanned, as well as a respective method.

According the invention this object is solved by the features indicated in the independent claims. Advantageous features are also indicated in the dependent claims.

A device according to the invention for scanning an optical data carrier by means of a main scanning beam being reflected by the data carrier and being detected by means of a photodetector, the data carrier having first and second layers to be scanned, the second layer being scanned through the first layer, light passing the first layer being shaded dependent on local properties of the first layer, is provided with means for keeping an output signal of the photodetector and, if provided for, a following amplification circuit independent of variations of shading. This has the advantage that an output signal which lies within a certain constant range is easy to further process, independent of the quality or the status of the shading causing layer.

The device comprises advantageously a scanning beam generating means having variable intensity control, the intensity being varied in proportion to the amount of shading. Also advantageously, it comprises an output signal amplifier having variable gain, the gain being varied in proportion to the amount of shading. Of course, also a combination of both features has positive effects. The changing transmission of the semitransparent layer or shading caused by it is detected by special means of the optical head of the device. In case that the beam generating means is a laser, the laser power is changed accordingly to compensate the shading. The laser power is tuned such that—independently whether the light is transmitted through a written area or a non-written area, or through the data area or the prepit area—no light intensity fluctuations occur on the recording surface during recording and no light intensity changes occur on the detector of the optical head during readout. For readout the compensation of the shading is preferably done via variation of the gain of the amplifier for the output signal of the photodetector. As the laser power should not exceed a certain level during readout, since data erasing could occur in this case, variation of gain is more appropriate for readout. However, also a combination of gain change and laser power change is advantageous e.g. because the variation range for the gain change is smaller in this case.

Advantageously, the device further comprises a beam generator for generating a shading detection beam, a photodetector for detecting said beam and delay means for delaying an output signal of said photodetector. In this way shading detection is easily and reliably performed. The beam generator is either a light source as a laser, a beam splitter as a semitransparent mirror, a grating or a holographic optical element, or another appropriate element. The shading detection beam is arranged ahead of the scanning beam, seen in scanning direction. It thus reaches an area of different shading earlier than the main scanning beam. This leaves sufficient time to prepare for timely adaptation of laser power or amplifier gain or both.

Preferably the detection beam is a preceding beam that is generated anyway for other purposes, e.g. for use in a three-beam scanning method where a tracking error signal is generated from side beams or using side beams to correct a signal generated from the main beam, as it is the case for the so-called well-known Differential Push Pull method. The distance, at the scanned layer, between detecting beam and main scanning beam is preferably chosen much larger then necessary for switching of power or gain. This makes possible to increase scanning speed or to perform additional tasks before shading occurs. Advantageously the shading detection beam signal is delayed, e.g. via a simple delay line or by being stored in a memory, so as to be available at the time where it is needed to initiate switching. Preferably the delay time is variable in order to make possible adaptation, e.g. to different scanning speeds, different speed of switching process, different data carrier properties or other properties that might alter or change in time or on other circumstances. It is also advantageously possible to use as detection beam a beam being arranged a relatively big distance ahead of the main scanning beam, e.g. arranged 90° or 180° degrees ahead, but scanning the same or nearly the same track. It is also one of the inventive solutions to determine shading effects by the main beam itself or a succeeding beam and to delay the respective signal for the time of a complete or nearly complete rotation of the disk. Another solution according to the invention lies in the fact that the beginning of a shading area is predicted from the location of an indicative position on the track, the distance from which to the shading area is known, and the disk rotation speed. For example the pre-pit areas are arranged according to pre-defined rules so that the beginning of a shading pre-pit area can be predicted from the time elapsed after having passed the preceding one.

A method for scanning an optical data carrier according to the invention comprises the steps of detecting variations of shading of the second layer and changing at least one of intensity of main scanning beam and amplification of photodetector output signal in proportion to the detected variations. This has the advantage, apart from those already indicated above, that it does not require a special process for the production of dual layer disks, but solves the object of the invention within the device.

Preferably a method according to the invention provides for detection of variations of shading by detecting intensity of a shading detection beam scanning the data carrier. Preferably the detected intensity signal is low-pass filtered. This has the advantage that high frequent disturbances, as such caused by the data stored on the disk or by high frequent variation of laser power, do not occur in the low-pass filtered signal. As already described above, it is advantageous to delay the intensity signal in dependency on the distance between shading detection beam and scanning beam, or in dependency on a known distance between a first indicative position and a second shading position.

According to the invention a method for preparing for scanning an optical data carrier having first and second layers to be scanned, the second layer being scanned through the first layer, light passing the first layer being shaded dependent on local properties of the first layer, provides for compensation of local differences in shading effect by providing the first layer with a shading pattern. That means that areas of the first layer that have a low shading effect are intentionally provided with a shading causing or increasing pattern. This pattern is designed such that it does not have an influence of reading from or writing to the first layer but ascertains sufficient shading for not having intensity fluctuations on the second layer. An advantage of this method is that it is to be performed only once, at the first writing on the first layer. All non-written areas may be provided then with a shading pattern and all pre-pit areas or similar areas are also provided with sufficient shading. Of course, the disk may also be pre-formatted during production or before being provided to the customer, so that direct access to both or all of the layers is possible without suffering from fluctuations.

Although the complete disk may be provided with a shading pattern according to the invention, it is especially advantageous to provide a shading pattern only in areas having predetermined characteristics, as the pre-pit areas or other areas having pre-embossed patterns. In case of a phase-change disk the transmission properties of the pre-pit areas are changed, during first recording of the semi-transparent first layer, to the same level as the recorded data area. Depending on the initial phase-change state of the disk, e.g. un-initialized disk with amorphous recording layer or initialized disk with crystallized layer, this can be done by erasing or writing a certain pattern in the prepit area. Certain in this case means that the shading pattern, of course, is to be chosen such as not disturb the readout of the pre-pit information.

According to the invention the shading pattern is either a grey level pattern or a pit pattern the pits of which are larger than the largest data recording pits or a pit pattern the pits of which being smaller than the smallest data recording pits.

The certain recorded or erased pattern is e.g. a grating structure, where adjacent tracks are amorphous-crystalline-amorphous-crystalline-etc. with bright-dark-bright-dark-etc. stripes. It is to be noted that different phase-change materials and/or layer stack designs exist. High-to-low or low-to-high materials/stacks means here that the ground state has high reflectivity or low reflectivity, respectively. However, ground state is usually supposed to be crystalline. Averaged over several tracks the reflectivity or, more important, the transmission is the same or nearly the same for pre-pit areas as for the data areas, where dark and bright data pits are recorded. The grating structure according to the invention, i.e. where the pattern is either a grey one or the pits of the shading pattern are either much larger or much smaller than the data pits or the pre-pits, assures that it does not degrade the readout of the pre-embossed pre-pits. Also a grating structure having stripes arranged in track direction but having a much smaller width lie within the scope of the invention.

Advantageously the shading pattern is also used to store additional information. Especially in the case of shading pits length or distance variations of these pits or different distinguishable grey levels may be used to store information as recording parameters, indication of the device, date of recording, copyright information, encryption parameters etc. Even if such information should, at present, not being readable by means of mass produceable devices, it might be applicable for copyright issues or for use with future devices being able to detect much larger or smaller pits.

Data carriers being provided with a shading pattern according to the invention as well as devices performing a method according to the invention also lie within the scope of the invention. This is also the case for combinations of features not especially named herein or changes of design lying within the scope of a skilled person. Further variants and advantages of the invention are also included in the following description of preferable embodiments using figures.

In the figures:

FIG. 1 shows a device according to the invention

Figure 2:
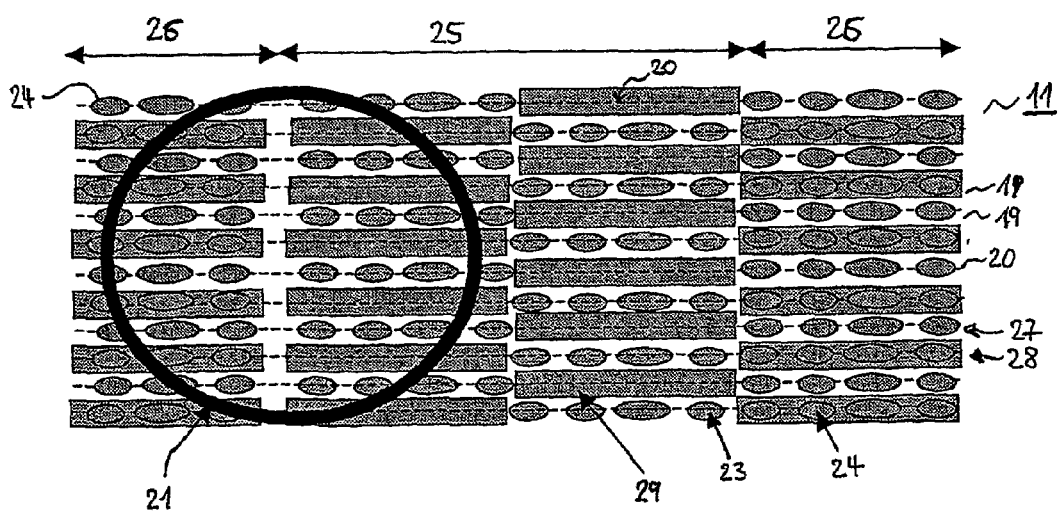
Figure 3:
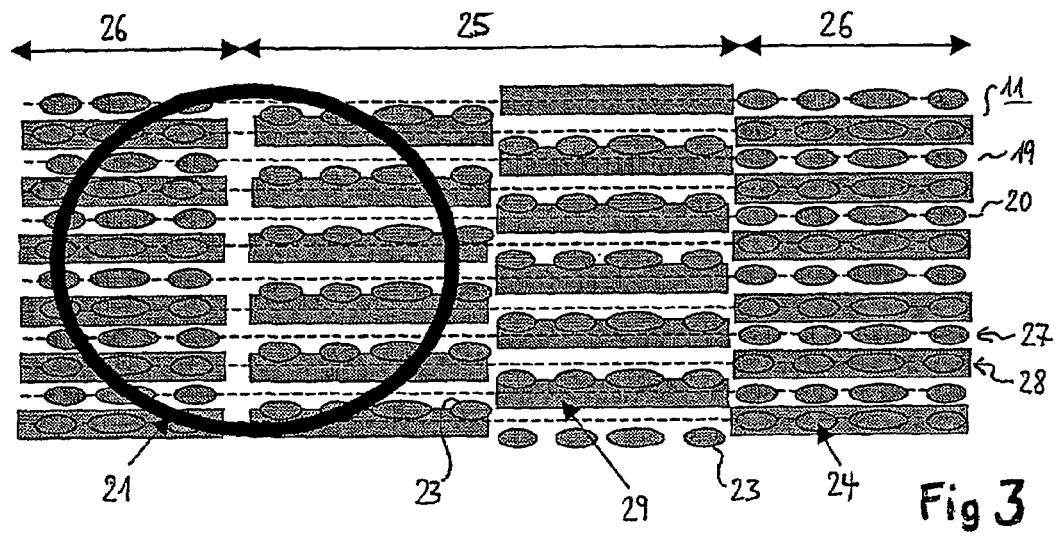
Figure 4:
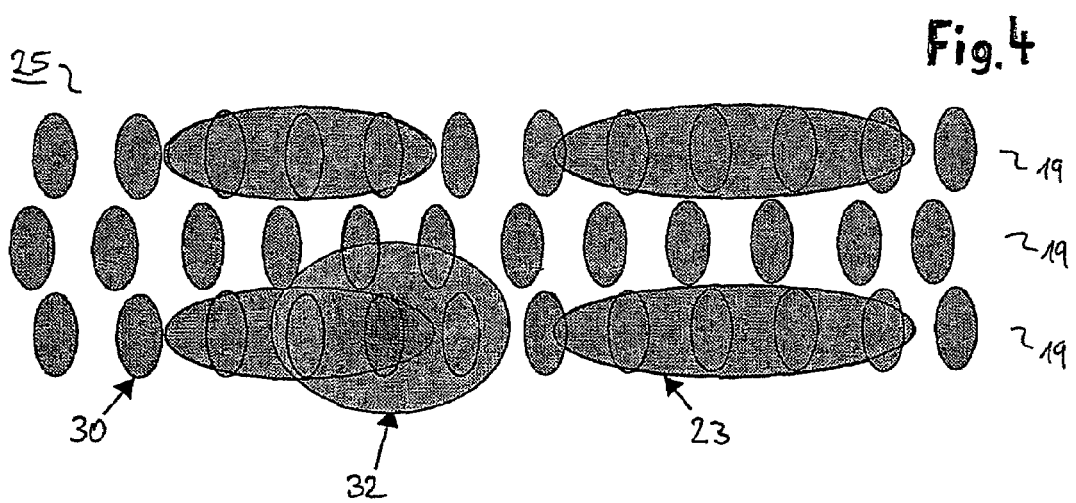
Figure 5:
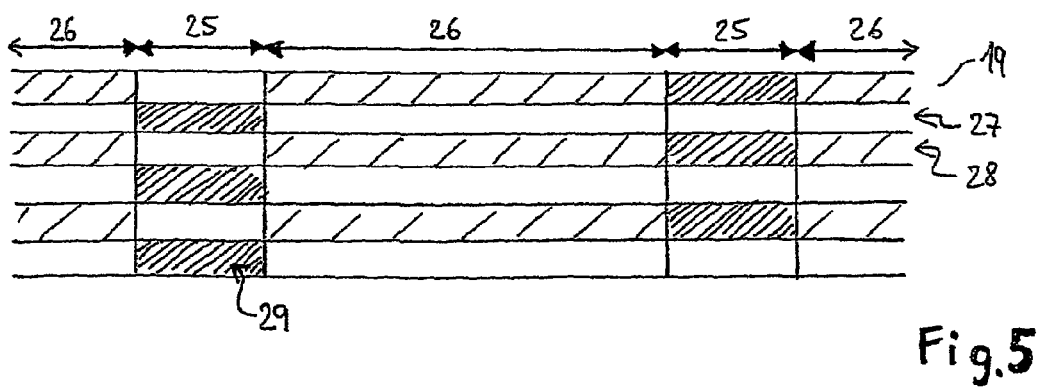

FIG. 2 shows a track structure with shading pattern according to the invention FIG. 3 shows another track structure with shading pattern according to the invention FIG. 4 shows a different type of shading pattern according to the invention FIG. 5 shows a further type of shading pattern according to the invention FIG. 1 shows a device according to the invention in a diagrammatic view. The optical data carrier is in this embodiment a disk 1, being shown in a partial cross sectional view. Dimensions are not to scale in order to more clearly show relevant features. Disk 1 is provided with a first recording layer 11 and a second recording layer 12. First layer 11 is a semitransparent layer while second layer 12 is a reflecting layer. Transparent cover layer 13 and intermediate layer 14 are provided but not described in detail here. At the right part of layer 11 a stack of layers 15 is indicated, as instead of a single layer 11 also several layers may be arranged above layer 2. However, only a single layer 11 will be described here, as application to a stack of layers 15 is a task within the scope of a skilled person.

The device comprises as light source a semiconductor laser 2 generating a scanning beam 3. The laser 2 is provided to be driven with different power. This enables the device to perform recording, adaptation to different types of disk 1 and adaptation according to the invention as described below.

Beam 3 is collimated by a collimator 4, passes through a beam splitter 5 and is focused by an objective lens 6 onto the second layer 12. A grating 7 is provided in the path of beam 3 for generating, apart from the main scanning beam 3, secondary beams 3', 3", of which one is used as a shading detection beam 3'. Shading detection beam 3' is arranged thus that it precedes main scanning beam 3 on the disk 1 in direction of scanning. Beam 3' is shown separately from main beam 3 at the lower part of FIG. 1 in an exaggerated way, as well as side beam 3". Beams 3, 3', 3" are reflected by second layer 12, directed by beam splitter 5 to a focussing lens 8 and focussed by lens 8 onto a photodetector 10.

Photodetector 10 comprises three detector areas 9, 9', 9" onto which beams 3, 3', 3" fall, respectively. Detector areas 9, 9', 9" are each subdivided into 2 or more detector elements in order to generate detector signals D necessary for performing control functions as focus control or tracking control and for generating a data signal according to known methods. By way of example, the astigmatism method may be implemented as focussing method, using detector area 9, the differential push pull method DPP, using all detector areas 9, 9', 9", may be implemented as tracking method. Elements necessary to perform these functions are known to the skilled person and are thus not depicted here.

Output signal D' of detector area 9' is supplied to a low-pass filter 16, the low-pass filtered signal DL is provided to an amplifier 17' having variable gain G' and output as shading detection signal SD. As an alternative solution, shading detection signal SD is supplied to a delay element 18 having a variable delay time T. The output signal of delay element 18 is the delayed shading detection signal SD'. Similar amplifiers 17, 17" having also variable gain G, G" are provided to amplify output signals of detector areas 9, 9", respectively. In most cases it will be appropriate to use identical gain for all three amplifiers, however, for some detection methods different gains might be preferable.

Scanning beam 3 is focussed onto the second layer 12 as a small scanning spot 22 while its cross section with the first layer 11 is an enlarged spot 21. This enlarged spot 21 covers an area of dark and bright areas and is thus shaded by the dark areas. The ratio between dark and bright areas is constant in case of a completely written area covered by spot 21. It is not constant in case also non-written areas fall within spot 21. Thus, different shading occurs in such cases, the intensity of the light forming scanning spot 22 fluctuates as the shading does.

During scanning disk 1, a forthcoming obscurity due to shading caused by the semi-transparent first layer 11 is probed by an additional, leading spot, here by a scanning spot 22' of shading detection beam 3'. This spot 22' is ahead of the main spot 22. The separation distance between main spot 22 and leading spot 22' is designed to allow timely laser power change or amplifier gain switching respectively, if shading occurs. Since the detection signal caused by shading is of low frequency, it is low-pass filtered and is thus not degraded by the data signal or rf laser modulation, both having high frequency. In case that so-called differential push-pull tracking method is applied, the leading spot 22' of the three beams 3, 3', 3" is preferably used for detecting shading caused by the first layer 11.

That means that the device according to the invention detects changes in the reflected intensity of shading detection beam 3' before the main readout beam is affected. This time difference is sufficient to switch gain for the main beam at exactly the time when the main beam intensity changes. This means that there is practically no change in the electronical readout signal of the main beam although shading is present.

FIG. 2 shows, in a diagrammatic way, a small part of the track structure of the first layer 11 of a multi layer disk 1 in top view. Several tracks 19 are arranged in parallel, the centre 20 of each track 19 is indicated by a dotted line. Indicated by a circle is the enlarged spot 21 of main scanning beam 3. Each track is provided with data markings, also named pits 23, 24, indicated here by ellipsoids of similar width perpendicular to the track direction but of different length in track direction. At the left and the right side of FIG. 2 there are depicted data areas 26 which extend much longer to the respective sides than indicated here. Between the data areas 26 there is arranged a header area 25. In case of a hard-sectorized disk 1, the header area 25 is provided with pre-embossed, permanent pits, so-called pre-pits 23. The pre-pits 23 are permanent, i.e. they cannot be written or deleted by a recording device. In the example shown in FIG. 2, pre-pits 23 are arranged only on one half of a track, either the one adjacent to the data area 26 on the left or to the one on the right. The pits 24 in the data area 26 are arranged on every track, provided that the layer 11 is already recorded. In the example shown the data area 26 consists of tracks 19 having a pre-embossed land-and-groove structure. Each land 27 is indicated in the drawing by a white background colour while each groove 28 is indicated with a dark background colour. Although this dark background is similar to the one in which the pits 23, 24 are coloured, the grooves do not have a shading effect as they do not prevent light from passing through them to the same amount as the pits 24 do. Pits 24 are recordable that means they are not present on a non-recorded layer and they may be erased from a recorded layer. In any case, pits 24 of a data area 26 cause a difference in light reflected by them, usually described as dark and bright difference, i.e. they cause shading of a layer below their own layer. This is different for the pre-pit pits 23 which do not induce shading as they do not have a similar shading effect as pits 24. In the data area 25, according to the invention, there is provided a shading pattern 29 consisting of pits much larger in length than the maximum length of pits 23, 24.

During the first recording of the semitransparent layer 11, the header area 25 is provided with a dark-bright pattern 29, which makes it in the far-field domain as transparent or reflective as the recorded data area 26. That means is there is a similar shading effect on second layer 12 caused by the header areas 25 as well as by the data areas 25 of first layer 11. The shading pattern 29 is here a grating structure with alternating dark/bright stripes, parallel to the prepits 23. However, any other structure of shading pattern that does not disturb readout of the prepit information, is also applicable.

Two cases for providing a pattern in the prepit area as described above are described in the following:

First, layer 11 is assumed to be completely non-initialized, which means that the recordable material of the semitransparent recording layer 11 is not in the crystalline ground state. In this case the recording layer needs to be initialized before the first recording. That means that the complete data area 26 has to be transformed to be in the crystalline ground state. It is completely initialized and the prepit area is provided with an alternating dark-bright pattern as described above. There are several possibilities to perform initialization, e.g. in a commercial drive using standard erase power, like continuous laser power, or in a special initializer equipment during the manufacturing process. The applied erase process with constant laser power does not disturb the readout of the prepit information. Another solution, not explicitely shown in FIG. 2, is not to write a dark-bright pattern 29, but a homogeneous grey level, which has the same optical transmittance as the recorded data area 26. This is possible for some materials having respective properties, using moderate laser power, i.e. at a power level that lies between erase power and maximum laser power.

Secondly, layer 11 is assumed to be completely initialized, that means the recording layer 11 is in the crystalline is ground state. In this case only the header area 25 needs to be provided with a dark-bright pattern as described above. This is done preferably by applying high writing laser power to write an amorphous pattern in the header area 25. For some materials the writing power is to be held constant, for other materials the writing power needs to be high frequency modulated, depending on respective material properties. High frequency modulation of the layer power may disturb readout of the prepits 23. In case of an embossed header area as depicted in FIG. 2 this problem is solved by writing only in the area not provided with prepits 23. In the areas provided with prepits 23 laser read power is applied. Since areas free of prepits 23 and areas provided with prepits 23 alternate in the embossed header area 25, in the far-field domain the reflectivity or transmission is homogeneously changed.

FIG. 3 shows a similar part of first layer 11 as shown in FIG. 2. Same parts are indicated by same reference numbers and only referred to if different to FIG. 2. The pre-pits 23 in the header area 25 are arranged off-centre, in the example exactly at an intermediate position between two adjacent track centres 20. For example according to the DVD-RAM standard such off-centred so-called wobble pits are used as pre-pits 23. In this case the Sector ID is repeated twice, in each of the off-centred prepit areas. For such DVD-RAM type embossed header area, the same shading pattern as described with regard to FIG. 1 may be applied, but system redundancy is decreased. It is therefore preferrable to apply writing laser power only on one half of the track in the header area 25, as shown in FIG. 2. In this case 50% of the prepits 23 may be unreadable during writing of the shading pattern. However, this usually is still sufficient to correctly readout the sector ID.

FIG. 5 shows another way to provide for a shading pattern 29 in case of off-centred pre-pits 23. For simplicity reasons neither pre-pits 23 nor pits 24 are shown, but only the different types of track 19, land 27 and groove 28. Different to FIGS. 2 and 3, several data areas 26 and several header areas 25 are shown. It can be seen that for each track 19 there is provided a shading pattern 29 in a complete header area 25, while the following header area 25 of the same track is completely free of shading pattern. That means according to this alternative solution only every second header area 25 is read completely and a shading pattern 29 is written to the header areas 25 between. Here, too, system redundancy is slightly reduced.

FIG. 4 shows a small part of a header area 25 with three adjacent tracks 19, two of them having pre-pits 23 in the figure. The shading pattern consists here of tiny pits 30, being of much smaller axial length, seen in axial direction of the track 19, than the pre-pits 23. These very small pits 30 are not detectable by the limited resolution of the optics usually provided for or the limited modulation transfer function (MTF) usually used. The size of a focused spot 32 of scanning beam 3 on this layer 11 is indicated here. It can be seen that it is too large to detect a single one of tiny pits 30.

It is to be noted that the invention refers mainly to shading effect. Shading effect denotes the low frequency change of the transmission properties of a first layer through which a second layer is scanned. These transmission properties change depending on if the first layer is recorded or unrecorded. In contrast thereto, high frequency variation of the second layer readout intensity occurs caused by varying spacial distribution of pits or other data markings of the first layer through which the scanning light beam passes before and/or after scanning the second layer. Such high frequency variations are often referred to as interlayer crosstalk.

Although, according to the invention, no special process for dual layer disk manufacturing is required, it is of course advantageous to produce disks 1 already provided with a shading pattern. Especially in case that a grey pattern is used, this can be easily performed in a simple additional production step or in a slightly changed initialization process. In case of changing of transmission property of the semi-transparent header area 25 during first recording process no special optical head is required. To increase storage capacity of optical disks, multi-layer recording on phase-change materials is a very promising technology. In combination with continuous or soft-sectorized formats like DVD+RW or DVD–RW no shading problem on the deeper second layer 12 occur, if the semitransparent first layer 11 is recorded completely. However, in case of hard-sectorized, land/groove formats the embossed header area 25 of the semi-transparent first layer 11 causes light fluctuations on the second layer 12. According to the invention several methods to avoid or to compensate light intensity fluctuations on the second layer 12 caused by an inhomogeneous, in terms of reflection and transmission, semi-transparent first layer 11 are proposed. Inhomogenities mainly occur in combination with non-continuous land/groove formats with embossed header areas 25. According to one solution the multilayer disk 1 is pre-processed in the recording device before or during the first recording session. In this case the standard disk manufacturing process can be used.

The invention claimed is:

1. Device for scanning an optical data carrier by means of a main scanning beam being reflected by the data carrier and being detected by means of a first photodetector, the data carrier having first and second layers to be scanned, the second layer being scanned through the first layer, light passing the first layer being shaded dependent on local properties of the first layer, the device being provided with means for keeping an output signal of the first photodetector independent of variations of shading, wherein the device comprises a beam generator for generating a shading detection beam and a second photodetector for detecting said shading detection beam.

2. Device according to claim 1, wherein it comprises at least one of a scanning beam generating means having variable intensity control and an output signal amplifier having variable gain, either of which being varied in proportion to the amount of shading.

3. Device according to claim 1, wherein it comprises a delay means for delaying an output signal of said second photodetector.

4. Method for scanning an optical data carrier by means of a main scanning beam being reflected by the data carrier and being detected by means of a photodetector, the data carrier having first and second layers to be scanned, the second layer being shaded dependent on local properties of the first layer, comprising the steps:

detecting variations of shading of the second layer by detecting the intensity of a shading detection beam scanning the data carrier, and changing at least one of the intensity of the main scanning beam and an amplification of a photodetector output signal in proportion to the detected variations.

5. Method according to claim 4, wherein variations of shading are detected by performing one or several of the following steps:

low-pass filtering the detected intensity signal, delaying the intensity signal in dependency on the distance between the shading detection beam and the scanning beam, delaying the intensity signal in dependency on a known distance between a first indicative position and a second shading position.

* * * * *